United States Patent
Uchida et al.

(10) Patent No.: US 10,126,549 B2
(45) Date of Patent: Nov. 13, 2018

(54) METHOD FOR DESIGNING LIGHT DIFFUSION PATTER, METHOD FOR MANUFACTURING LIGHT DIFFUSION PLATE, AND LIGHT DIFFUSION PLATE

(71) Applicant: KURARAY Co., Ltd., Kurashiki-shi (JP)

(72) Inventors: Atsushi Uchida, Ibaraki (JP); Masashi Hirai, Ibaraki (JP); Masaru Karai, Ibaraki (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 4 days.

(21) Appl. No.: 15/303,125

(22) PCT Filed: Apr. 9, 2015

(86) PCT No.: PCT/JP2015/002010
§ 371 (c)(1),
(2) Date: Oct. 10, 2016

(87) PCT Pub. No.: WO2015/155993
PCT Pub. Date: Oct. 15, 2015

(65) Prior Publication Data
US 2017/0031156 A1    Feb. 2, 2017

(30) Foreign Application Priority Data
Apr. 11, 2014  (JP) .................................. 2014-081863

(51) Int. Cl.
*G02B 27/00* (2006.01)
*G02B 3/00* (2006.01)
*G02B 5/02* (2006.01)

(52) U.S. Cl.
CPC ....... *G02B 27/0012* (2013.01); *G02B 3/0043* (2013.01); *G02B 5/0221* (2013.01); *G02B 5/0263* (2013.01); *G02B 5/0268* (2013.01)

(58) Field of Classification Search
CPC .... G02B 5/02; G02B 27/0012; G02B 3/0043; G02B 5/0221; G02B 5/50263;
(Continued)

(56) References Cited

U.S. PATENT DOCUMENTS

| 5,534,386 A | 7/1996 | Petersen et al. |
| 5,694,246 A | 12/1997 | Aoyama et al. |

(Continued)

FOREIGN PATENT DOCUMENTS

| JP | H11-160505 A | 6/1999 |
| JP | 2001-100621 A | 4/2001 |

(Continued)

OTHER PUBLICATIONS

International Search Report dated Jul. 7, 2015 in PCT/JP2015/002010 filed Apr. 9, 2015.
(Continued)

*Primary Examiner* — Darryl J Collins
*Assistant Examiner* — Kristina Deherrera
(74) *Attorney, Agent, or Firm* — Oblon, McClelland, Maier & Neustadt, L.L.P.

(57) ABSTRACT

The present invention provides a method for designing a light diffusion pattern with which a light diffusion pattern to exhibit desired light diffusion properties can be designed depending on a few systematic procedures. The method includes a lens data preparation step of preparing lens data having desired light diffusion properties, a placement step of placing a plurality of lens data (100) prepared in the lens data preparation step in a predetermined region (200), a cutting step of, when an overlap (210) of lenses (100) occurs
(Continued)

in the placement step, cutting out a part (421) of a lens shape to eliminate the overlap (210), and a repositioning step of replicating a shape of the cutout part (421) and repositioning it to another place.

9 Claims, 24 Drawing Sheets

(58) Field of Classification Search
CPC .... G02B 5/0268; G02B 3/0068; G02B 1/041; G02B 3/0006–3/0012; G02B 3/0025; G02B 3/0031; G02B 3/0037; G02B 2003/0093; G02B 5/0205–5/021; G02B 5/0278; G02F 1/133504
USPC .... 359/599, 642, 896, 707; 349/62, 64, 112; 362/244, 246, 317, 355, 558; 425/404, 425/808
See application file for complete search history.

(56) References Cited

U.S. PATENT DOCUMENTS

| | | |
|---|---|---|
| 6,111,699 A | 8/2000 | Iwata et al. |
| 7,046,439 B2 * | 5/2006 | Kaminsky .............. G02B 1/041 359/452 |
| 8,289,230 B2 * | 10/2012 | Nishi .................... F16M 11/10 345/7 |
| 2002/0142133 A1 | 10/2002 | Matsunaga et al. |
| 2004/0130790 A1 | 7/2004 | Sales |

FOREIGN PATENT DOCUMENTS

| | | |
|---|---|---|
| JP | 2002-196117 A | 7/2002 |
| JP | 2006-500621 A | 1/2006 |
| WO | 95/03935 A1 | 2/1995 |
| WO | 2004/027495 A2 | 4/2004 |

OTHER PUBLICATIONS

Combined Chinese Office Action and Search Report dated Mar. 23, 2018, in Patent Application No. 201580019192.3 (with English translation), 16 pages.

\* cited by examiner

METHOD FOR DESIGNING LIGHT DIFFUSION PATTER, METHOD FOR MANUFACTURING LIGHT DIFFUSION PLATE, AND LIGHT DIFFUSION PLATE

CROSS-REFERENCE TO RELATED APPLICATIONS

This application is a National Stage of PCT/JP2015/002010, which was filed on Apr. 9, 2015. This application is based upon and claims the benefit of priority to Japanese Application No. 2014-081863, which was filed on Apr. 11, 2014

TECHNICAL FIELD

The present invention relates to a light diffusion plate and, more specifically, to a method for designing a light diffusion pattern of a light diffusion plate.

BACKGROUND ART

In a directly under lighting device, a light diffusion plate is used to make light from a light source (halogen lamp, LED, laser etc.) gentle for eyes. Note that, however, in order to prevent deterioration in the quality of lighting, it is necessary to reduce lighting irregularities and coloring due to direct transmission of lamp image and occurrence of interference pattern. Therefore, the light diffusion plate is required to have a a characteristic of uniformly diffusing light as well as a characteristic of high transmittance. An opaque white colored light diffusion plate is the most typically known light diffusion plate. The light diffusion properties of the opaque white colored light diffusion plate was obtained by adding light diffusion particles such as glass, acrylic, barium sulfate, titanium dioxide, ammonium oxide and silicon rubber to base resin with a high light transmittance such as acrylic resin and polycarbonate resin, and irregularly reflecting incident light by those light diffusion particles.

It is necessary to add a large quantity of light diffusion agent to the opaque white colored light diffusion plate in order to impart light diffusibility to the light diffusion plate that is enough to make lamp image invisible. In this case, a light transmittance of the light diffusion plate is to be lowered. Therefore, in many of light diffusion plates suitable for directly under lighting systems, which are increasing in number rapidly, the type, the diameter and the blending volume of light diffusion particles are regulated to achieve a high transmittance and high light diffusion (Patent Literature 1).

Further, as light diffusion plates with no use of light diffusion particles, a light diffusion plate having a microscopic random concave and convex pattern formed by laser interference exposure (Patent Literature 2) and a light diffusion plate having a microscopic random concave and convex pattern formed by sandblasting, embossing or the like (Patent Literature 3) are known. In addition, a light diffusion plate having a random concave and convex pattern which is obtained by placing a variety of microlenses according to a probability distribution by laser machining or the like (Patent Literature 4) is known.

CITATION LIST

Patent Literature

PTL1: Japanese Unexamined Patent Application Publication No. H11-160505
PTL2: Japanese Unexamined Patent Application Publication No. 2001-100621
PTL3: Japanese Unexamined Patent Application Publication No. 2002-196117
PTL4: Japanese Unexamined Patent Application Publication (Translation of PCT Application) No. 2006-500621

SUMMARY OF INVENTION

Technical Problem

In the light diffusion plates according to related art, light diffusion properties are determined by adding light diffusion particles or forming a microscopic random concave and convex pattern on the surface of the light diffusion plate. However, in the light diffusion plate where light diffusion particles are incorporated inside a member, the angular distribution of light diffusion properties is restricted by the light diffusion particles because the shapes of them are spherical in many cases. Further, in the light diffusion plate where light diffusion particles with different diameters are randomly distributed over the surface of an element, there are many gaps between the light diffusion particles, and it is thereby difficult to enlarge light diffusion angle. On the other hand, in the light diffusion plate where a microscopic random concave and convex pattern is formed by sandblasting, embossing or the like, there is a problem that it is difficult to make surface roughness uniform over a wide area and it is difficult to reproduce a light diffusion plate which has equal quality in surface roughness. Further, in the technique of placing different microlenses according to a probability distribution by laser machining or the like, the positions of the respective lenses cannot be designated only by a probability density function, and in reality the lens positions is required to be determined in optional processes based on a probability density function followed by being molded by a processing machine. Further, there is a problem that the flexibility of design is too high in the case of defining with a probability density function, which causes significant increase in design cost for obtaining desired diffusion properties.

A random pattern obtained is rather a product of chance in any cases of light diffusion agent addition, laser interference exposure and sandblasting, and the same pattern is not always obtained for all products. Therefore, there is a fundamental problem that it is not beyond probability whether or not a final product exhibits desired light diffusion properties An object of the present invention is to provide a light diffusion plate having desired light diffusion properties and good reproducibility in quality. In addition, the present invention provides a method for designing a light diffusion pattern with which a light diffusion pattern exhibiting desired light diffusion properties can be designed depending on a few systematic procedures.

Solution to Problem

A method for designing a light diffusion pattern according to the present invention is a method for designing a light diffusion pattern in which a light diffusion pattern of a light diffusion plate is designed, the method including a lens data preparation step of preparing lens data having desired light diffusion properties, a placement step of placing a plurality of lens data prepared in the lens data preparation step in a predetermined region, a cutting step of, when an overlap of lenses occurs in the placement step, cutting out a part of a lens shape to eliminate the overlap, and a repositioning step of replicating a shape of the cutout part and repositioning it to another place.

In the present invention, it is preferred that the lens data preparation step includes a step of designing a reference lens having desired light diffusion properties, and a step of creating a similar shape to the reference lens.

In the present invention, it is preferred that the placement step, the cutting step and the repositioning step are performed repeatedly until a ratio of vacant space of a light diffusion pattern becomes equal to or less than a predetermined value.

In the present invention, it is preferred that, in the cutting step, when one lens and another lens overlap, the another lens is cut along a surface perpendicular to a bottom surface so as to leave the one lens.

In the present invention, it is preferred that, in the cutting step, when one lens and another lens overlap, the one lens and the another lens are cut along a surface including an intersection line between visible outlines of the lenses.

In the present invention, it is preferred that the light diffusion pattern is designed in a unit region, and extends to a predetermined area by combining the unit regions In the present invention, it is preferred that the light diffusion pattern in the unit regions is designed so that the lens shape is continuous at a boundary between the combined unit regions.

A method for manufacturing a light diffusion plate according to the present invention is characterized by manufacturing a light diffusion plate by preparing a metal mold having a light diffusion pattern designed by the above-described method for designing a light diffusion pattern, and molding resin by using the metal mold.

A light diffusion plate according to the present invention is a light diffusion plate having a light diffusion pattern where a plurality of microscopic lenses are placed on one side, the light diffusion pattern is formed by placing a reference lens in a shape designed to have desired light diffusion properties, a similar lens in a similar shape to the reference lens, and a partial shape created by cutting the reference lens and the similar lens along a surface intersecting with a bottom surface, wherein the light diffusion pattern has vacant space with predetermined ratio of or less.

Advantageous Effects of Invention

According to the present invention, it is possible to design a light diffusion pattern to exhibit desired light diffusion properties by a few systematic procedures. Further, it is possible to obtain a light diffusion plate having desired light diffusion properties and good reproducibility in quality.

DESCRIPTION OF EMBODIMENTS

Figure 1:
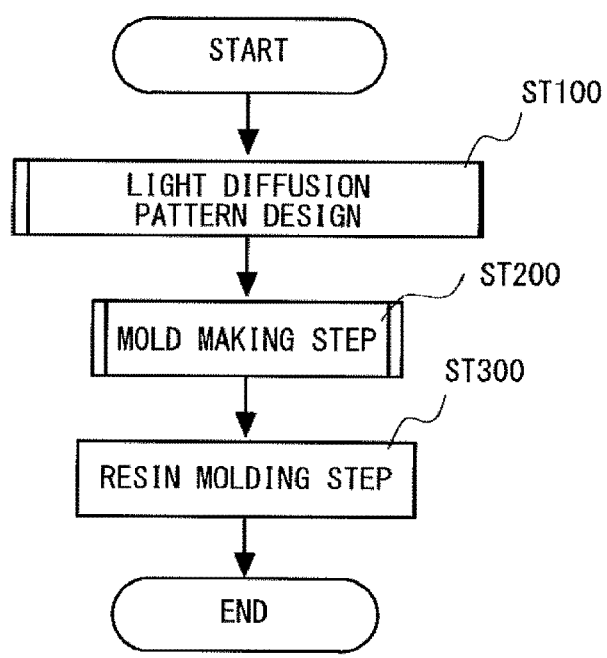
FIG. 1 is a flowchart showing a procedure of a method for manufacturing a light diffusion plate.

An embodiment of the present invention is illustrated in the drawings and described hereinafter by referring to the reference symbols of elements in the drawings.
(First Embodiment)
Prior to describing the embodiment in detail, the basic concept of this embodiment is briefly described.

In this embodiment, when forming a light diffusion pattern on a light diffusion plate, all concaves and convexes of the light diffusion pattern are designed to exhibit desired light diffusion properties, without depending on random concaves and convexes that are formed by chance. Note that, although interference can be avoided by placing concaves and convexes in different sizes and shapes in random order, it is actually not feasible to merely design a random pattern using any random numbers generated by a computer, and it would be difficult to know whether or not light diffusion properties can be achieved.

In view of the foregoing, as a result of intensive studies, the present inventors have found a method for designing a light diffusion pattern having desired light diffusion properties originated from a small number of (e.g., one, two or three) reference lenses with a systematic procedure.

The procedure is described sequentially.

FIG. 1 is a flowchart showing a procedure of a method for manufacturing a light diffusion plate.

A method for manufacturing a light diffusion plate according to this embodiment includes:
a step of designing a light diffusion pattern for exhibiting desired light diffusion properties (ST100),
a step of making a mold of the light diffusion pattern (ST200), and
a step of transferring the light diffusion pattern to resin using the mold (ST300).

Those steps are described sequentially hereinbelow.

(Light Diffusion Pattern Design Step)

First, the light diffusion pattern design step (ST100) is described.

Figure 2:
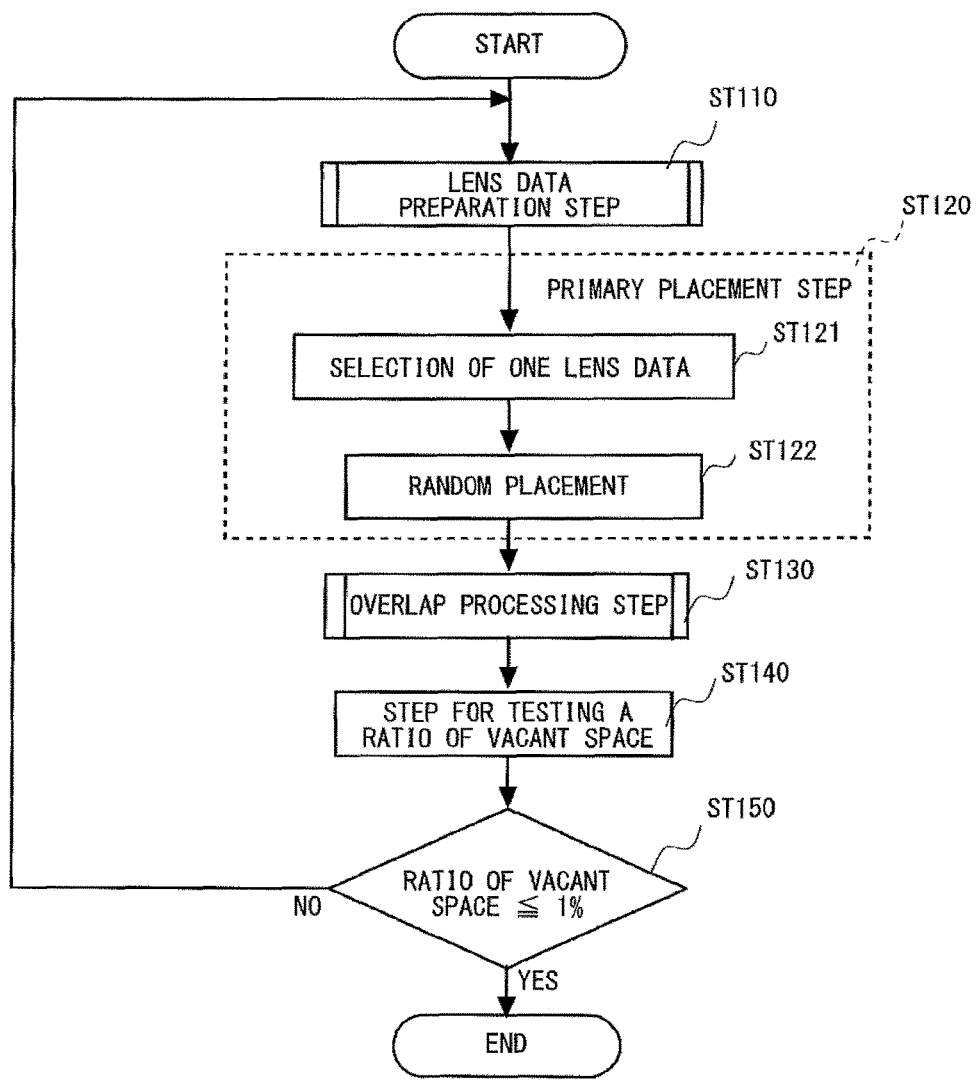
FIG. 2 is a flowchart sowing a procedure of a step of designing a light diffusion pattern (ST100)

FIG. 2 is a flowchart showing a procedure of the light diffusion pattern design step (ST100).

Note that the light diffusion pattern design step (ST100) may be performed by a worker using a computer. Specifically, a general computer that includes CPU, ROM, RAM, input means (keyboard and mouse) and output means (monitor, printer, data output port) into which a lens design program is incorporated may be used.

The first to be performed in the design of a light diffusion pattern is preparation of lens data (ST110). Because a light diffusion pattern is formed by placing microscopic concaves and convexes in a surface region of a predetermined size, it is necessary to prepare convex bodies and concave bodies that serve as base elements to be placed. As a matter of course, not anything can be used as the convex bodies and the concave bodies as base elements.

To attain desired light diffusion properties, design of base elements are very important. Another thing to be taken into consideration is to prevent the occurrence of interference even when many base elements are placed.

When there is only one type of basic element, interference is likely to occur when one type of basic elements are placed. However, it takes a lot of trouble to carry out design work by simulating elements one by one to prepare a plurality of base elements.

In view of the above, the lens preparation step (ST110) is performed as follows.

Figure 3:
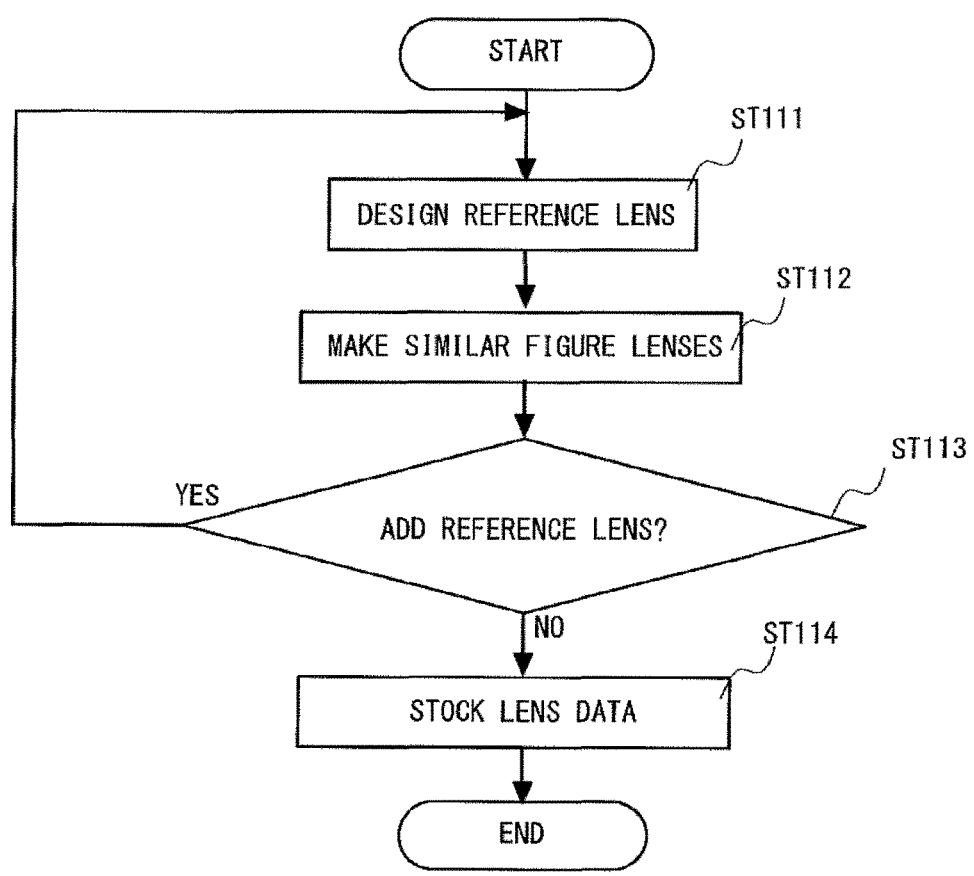
FIG. 3 is a flowchart showing a detailed procedure of a lens preparation step (ST110).

FIG. 3 is a flowchart showing a detailed procedure of the lens preparation step (ST110).

Figure 4:
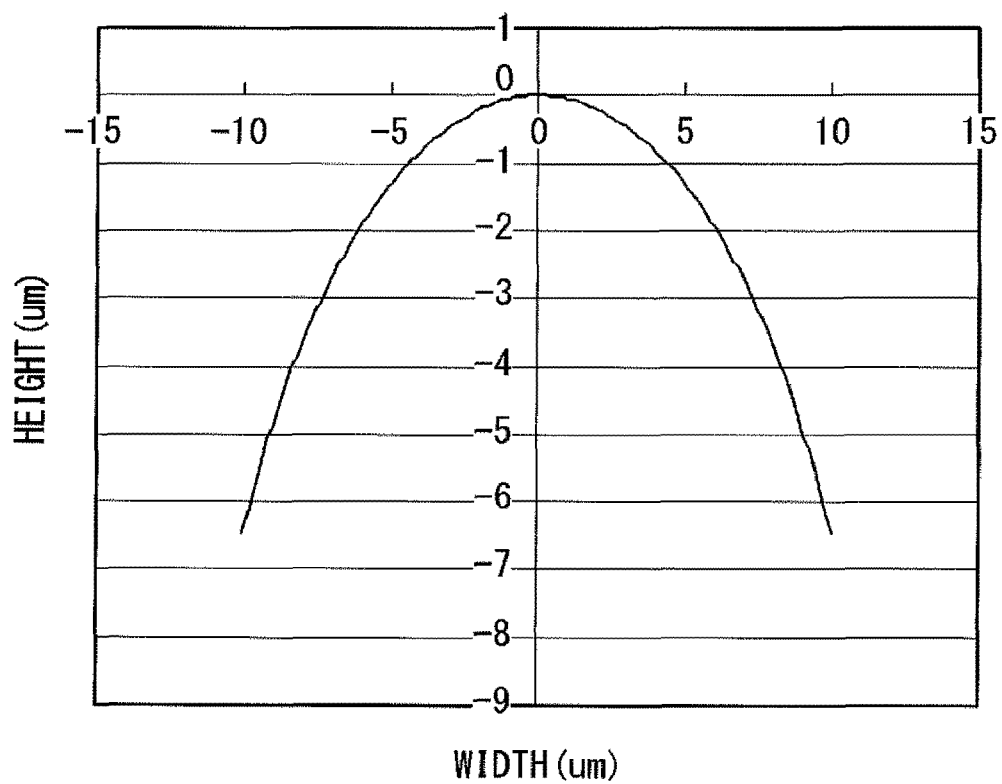
FIG. 4 is a view showing an example of a reference lens designed to have a light diffusion angle of 60 degrees.

First, one reference lens is designed (ST111). The reference lens is designed to obtain desired light diffusion properties. FIG. 4 is a view showing an example of a reference lens 100 that is designed to have a light diffusion angle of 60 degrees. The reference lens 100 is a hemispherical convex lens having a plane bottom surface.

Figure 5:
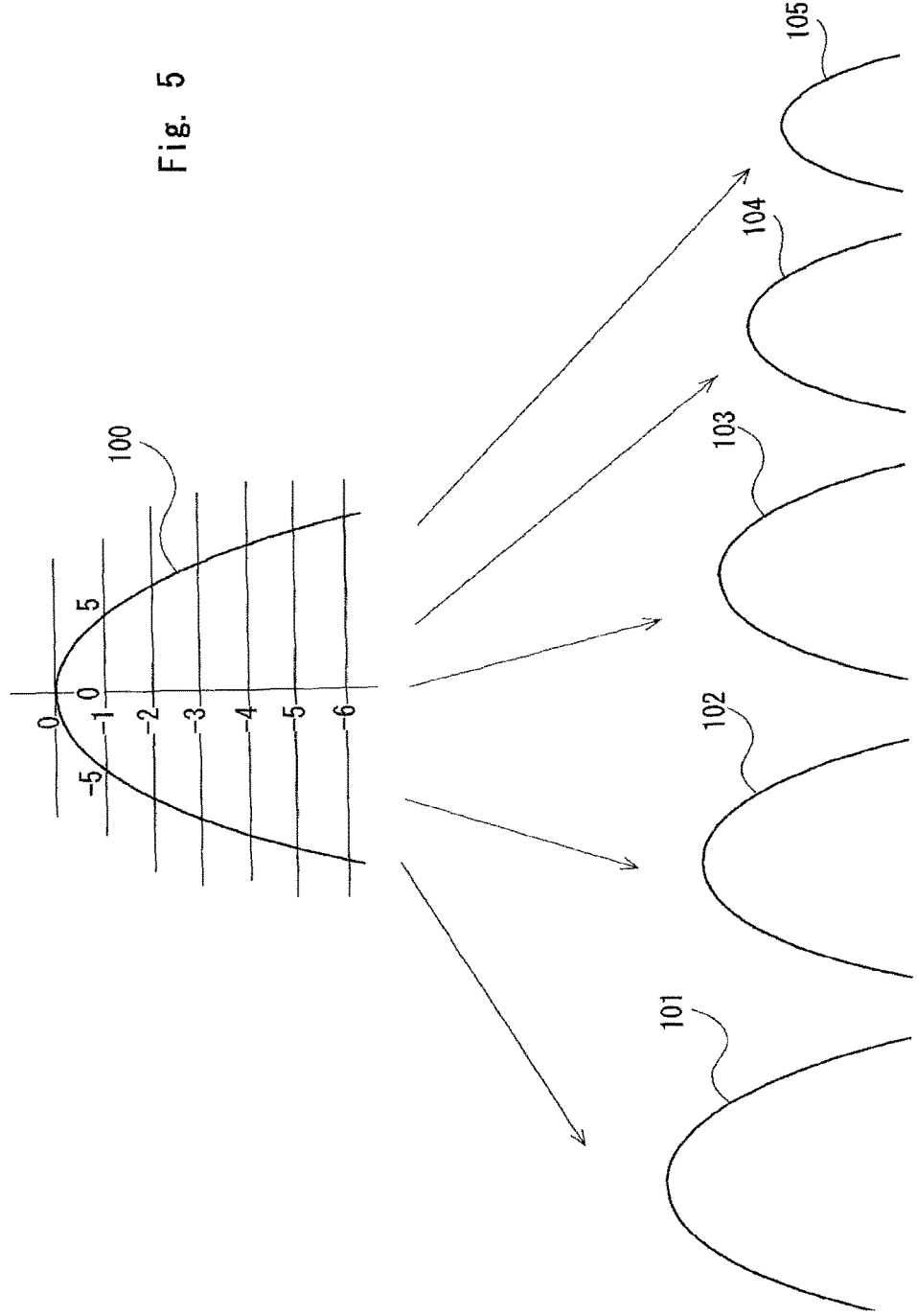
FIG. 5 is a view showing five types of similar figures with different magnifications created on the basis of one reference lens

After the reference lens 100 is designed in the above manner, the number of types is increased using the reference lens 100. To be specific, a plurality of similar figures to the reference lens 100 are created (ST112). FIG. 5 is a view showing five types of similar figures 101 to 105 with different magnifications created on the basis of one reference lens 100. The number of similar figure lenses is not limited to five, and it may be any number of one or more. As a matter of course, the number of similar figure lenses required to fill a pattern region may be calculated in advance, and only a required number of similar figure lenses may be generated Although the height from the bottom surface of the lens is not particularly limited, it is preferably 30 µm or less in order that the surface concaves and convexes of the light diffusion plate as a final product are not visible to human eyes. Further, the height of the lens is preferably 1 µm or more in terms of easier control of three-dimensional shape at the time of manufacture.

When increasing the number of types of reference lenses, S111 and S1112 are repeated (S113). The occurrence of interference can be effectively prevented by combining a plurality of types of reference lenses with different light diffusion angles. The number of reference lenses may be adjusted appropriately in consideration of the performance required for the light diffusion plate, working hours for design, and costs. The reference lens 100 and the similar figures 101 to 105 created in this manner are stocked as lens data (ST114). The lens data preparation step (ST110) thereby ends.

Referring back to the flowchart of FIG. 2, a primary placement step is performed in ST120.

In the primary placement step (ST120), the lens data (100 to 105) prepared in advance is placed in a plane. As a specific procedure, because the reference lens 100 and the five similar figures 101 to 105 are prepared beforehand (ST110), one lens is selected from them in ST121. A lens with the largest bottom area is normally selected; however, a lens may be randomly selected by a computer.

Then, in ST122, the selected lens data is placed in a plane.

Figure 6:
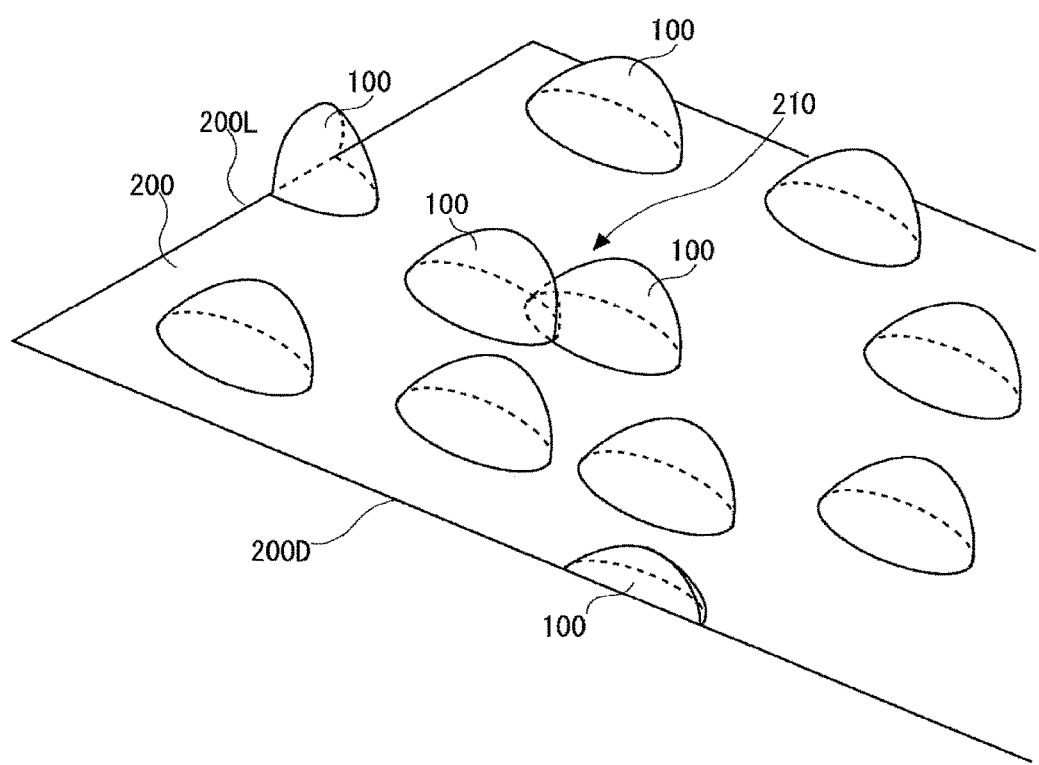
FIG. 6 is a view showing an example where reference lenses are placed at random.

A case where the reference lens 100 is selected (ST121) and the reference lenses 100 are primarily placed in a plane is described hereinafter by way of illustration As shown in FIG. 6, the reference lenses 100 are placed in random order on a rectangular plane 200 with a predetermined area. When placing the lenses randomly, a worker may manually put them one by one, or a computer may automatically execute the placement. For example, coordinates with x-axis and y-axis may be set to the plane 200, and a pair (x,y) of random numbers may be generated by the computer. Then, the pair (x,y) of random numbers may be set as the central coordinate of the lens bottom surface.

In this manner, the lenses 100 are placed at random in the plane.

This process may place different lenses each time in random order, such as randomly placing the lenses 100, then randomly placing another type of lenses, such as the lenses 101, and after that, randomly placing yet another type of lenses, such as the lenses 105, for example, and the process may repeat such placement according to need.

Note that, when one lens 100 is placed, a certain region is occupied by the bottom surface of the lens. In the case of generating a pair of random numbers by a computer, the region that is occupied by the bottom surface of the lens 100 which is already placed is excluded from the area for which random number pairs are to be generated.

When the lenses are placed randomly in this manner, some lens can be placed on the edge of the plane 200. In FIG. 6, one lens 100 is placed on the edge of a left side 200L, and another lens 100 is placed on the edge of a lower side 200D. In this case, the lens 100 may be trimmed at the edge.

Further, when the lenses are placed randomly, the placed lenses can overlap each other in some cases.

In the place indicated by the reference symbol 210 in FIG. 6, two lenses 100 and 100 overlap each other. The fact that the two lenses 100 and 100 overlap each other means that the bottom surfaces of the two lenses 100 and 100 have some region in common.

The random placement (ST122) in the primary placement step (ST120) allows the overlap of lenses. Specifically, even when the lenses overlap as a result of random placement, the primary placement of lenses is continued without any modification.

Note that, however, when almost no lenses are placed such as at the beginning of the primary placement step (ST120), lenses may be placed at a time in the area that is 30 to 80% of the plane 200. To be specific, one type of lenses generated in the lens preparation step (ST110) is selected, the lenses are placed simply in random order using random numbers, and this process is repeated until a certain area is filled with lenses. Some constraint conditions may be applied to the lens placement, and the placement may be adjusted. Examples of the constraint conditions are that the lenses do not overlap each other, the distance between the nearest lenses is a predetermined value or more, and the like. To meet the conditions, a worker may manually put the lenses one by one, or a computer may automatically execute the placement.

Because the overlap part generated in the random placement step (ST120) cannot remain unmodified, the overlap part is processed by the following overlap processing step (ST130).

(Overlap Processing Step)

The overlap processing step (ST130) is described hereinbelow.

As a result that the lenses 100 are placed as shown in FIG. 6 by the random placement (ST122) in the primary placement step (ST120), the lenses overlap with each other in a certain part. In the overlap processing step (ST130), the overlap part is cut out, and the cutout part is repositioned to another place.

Figure 7:
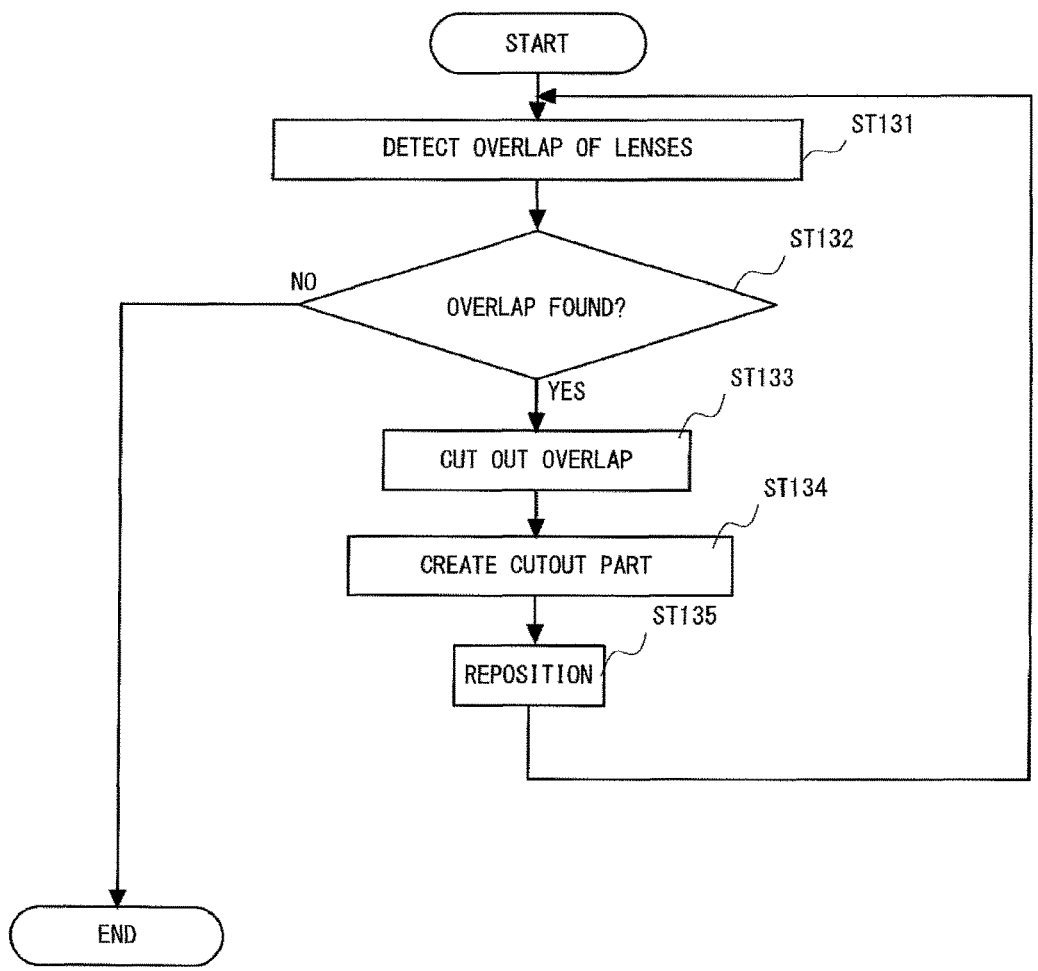
FIG. 7 is a flowchart showing a detailed procedure of an overlap processing step (ST130).

FIG. 7 is a flowchart showing a detailed procedure of the overlap processing step (ST130).

First, the overlap of lens data is detected (ST131). The plane 200 is inspected sequentially from the upper left end to the lower right end. Then, when an overlap part is found (Yes in ST132), the overlap part is cut out (ST133).

A specific way of cutting is described. For example, in FIG. 6, there is the overlap of lenses in the place indicated by the reference symbol 210.

Figure 8:
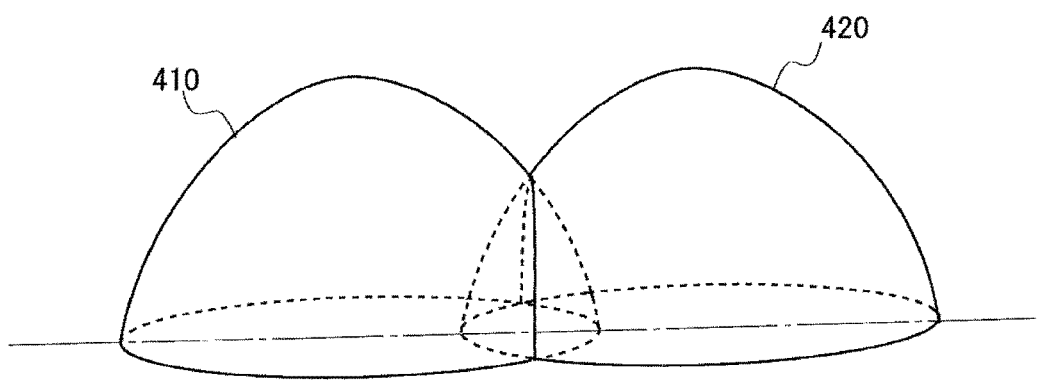
FIG. 8 is a view showing two overlapping lenses in a larger scale.

This part is shown in FIG. 8 in a larger scale. New reference symbols are used for description. One of two overlapping lenses is denoted by the reference symbol 410, and the other one is denoted by the reference symbol 420.

When cutting out an overlap, one lens 410 is left, and the other lens 420 is cut along a surface perpendicular to the bottom surface.

(It makes no difference which is to be left and which is to be cut.)

Figure 9:
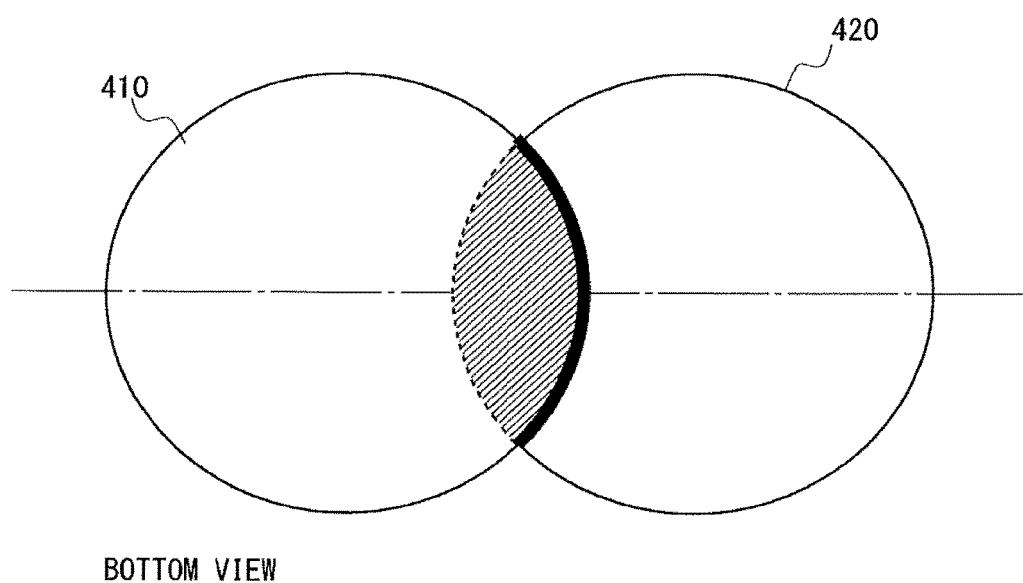
FIG. 9 is a view showing bottom surfaces of overlapping lenses.

FIG. 9 is a view showing the bottom surfaces of the lens 410 and the lens 420. Because the lens 410 is left and the lens 420 is cut, the visible outline of the bottom surface of the lens 410 is a line for cutting.

To be more specific, a part of the visible outline of the bottom surface of the lens 41 which overlaps the bottom surface of the lens 420 is a line for cutting. In FIG. 9, this line for cutting is indicated by a heavy line. The lens 420 is cut along a surface 220 that includes this line for cutting and that is perpendicular to the bottom surface (see FIG. 10).

Figure 10:
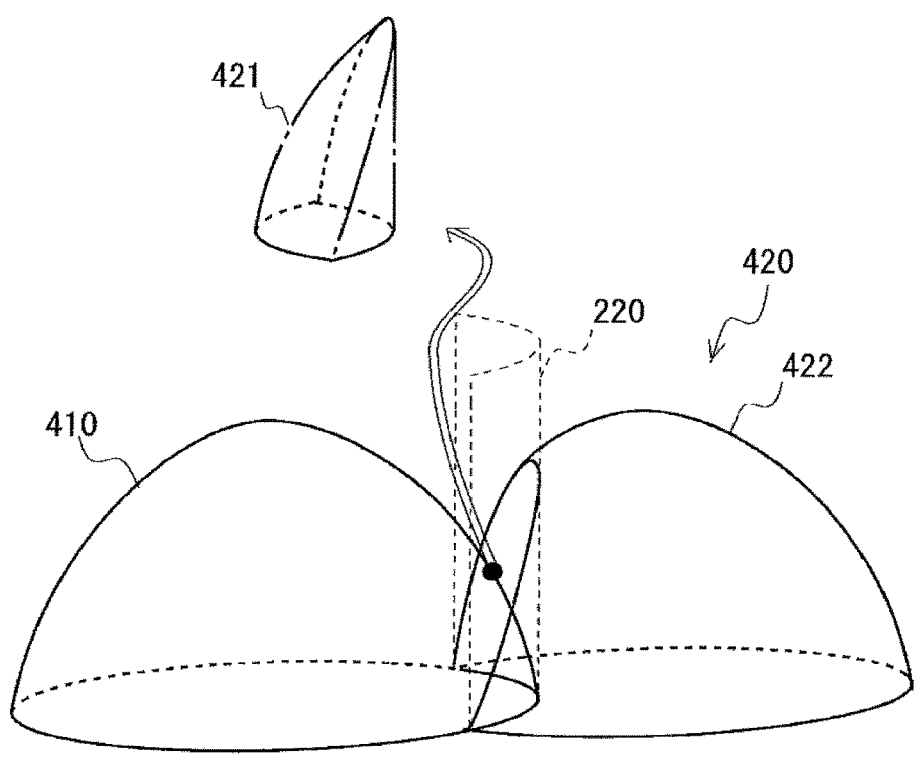
FIG. 10 is a view showing cutting of an overlap part from overlapping lenses.

Note that, in this case, the surface for cutting 220 is curved. As shown in FIG. 10, a part 421 of the lens 420 is cut out, and thereby the overlap between the lens 410 and the lens 420 is eliminated.

While the overlap of lenses is eliminated in this manner, the cutout part (421) is not discarded, which is one feature of this embodiment.

In the lens preparation step (ST110) performed earlier, the shape of the reference lens 100 is designed to have a desired light diffusion angle.

A bottom part of the lens shape is important for the lens shape to exhibit light diffusion capability.

In other words, the lower part of the lens shape is more important than the upper part.

However, in order to eliminate an overlap, it is necessary to cut out the overlap part (ST133). The part to be cut out is the bottom of the lens shape as a matter of course.

When the bottom part of the lens shape is removed, desired light diffusion properties cease to exist.

In view of the above, the present inventors devised a technique that replicates the cutout part (421) and repositions it to another place. It is thereby possible to exhibit desired light diffusion properties as a whole.

Figure 11:
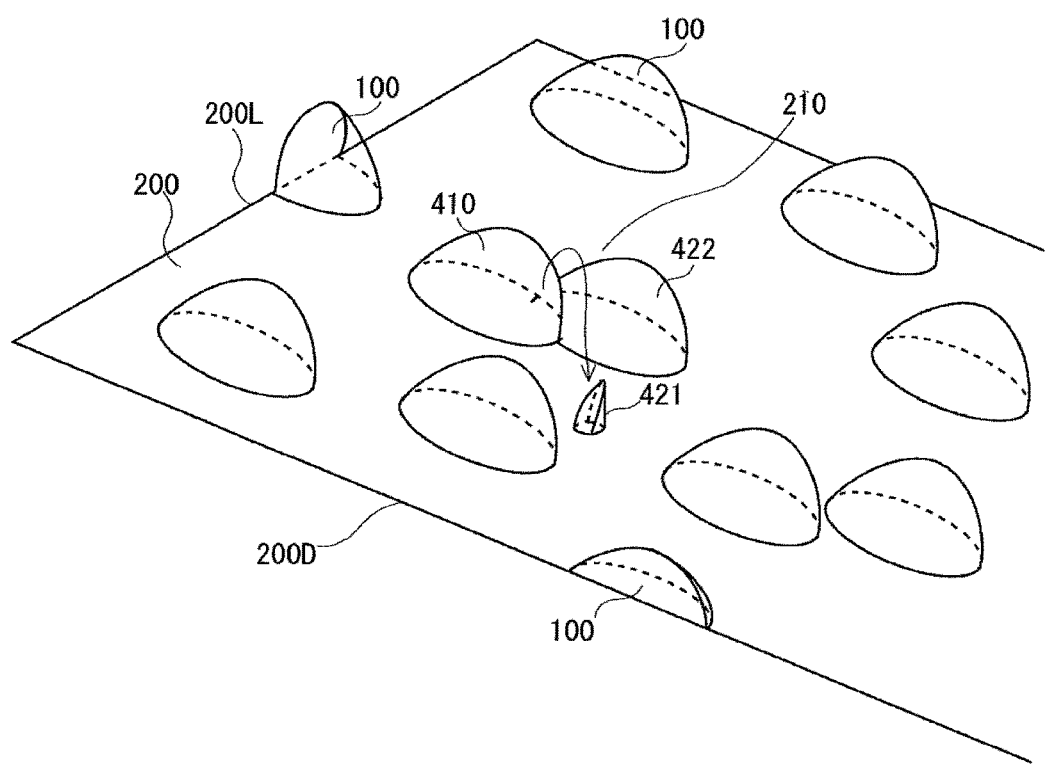
FIG. 11 is a view showing repositioning of a cutout part.

To be specific, as shown in FIG. 11, the shape data of the part 421 that has been cut in ST133 is replicated (ST134), and repositioned to another place (ST135).

In this manner, the process steps ST131 to ST135 are repeated to eliminate all overlaps (No in ST132).

When the overlap processing is done, a ratio of vacant space is tested, referring back to the flowchart of FIG. 2 (ST140).

In order to prevent the transmission of light, a gap between lenses should not be too large. Thus, a ratio of vacant space is calculated (ST140). When the ratio of vacant space is equal to or less than a predetermined threshold (which is 1% in this example) (Yes in ST150), the light diffusion pattern design step (ST100) ends. On the other hand, when the ratio of vacant space is still large, the process returns to the primary placement step (ST120).

When the process loops back, another lens data is selected in ST121. For example, when the reference lens 100 is selected in the previous loop, one of the five similar figures 101 to 105 is selected in this loop. Note that, however, a lens may be selected in any way, and it may be selected randomly and, in this case, there is a possibility that the same lens is selected again.

Figure 12:
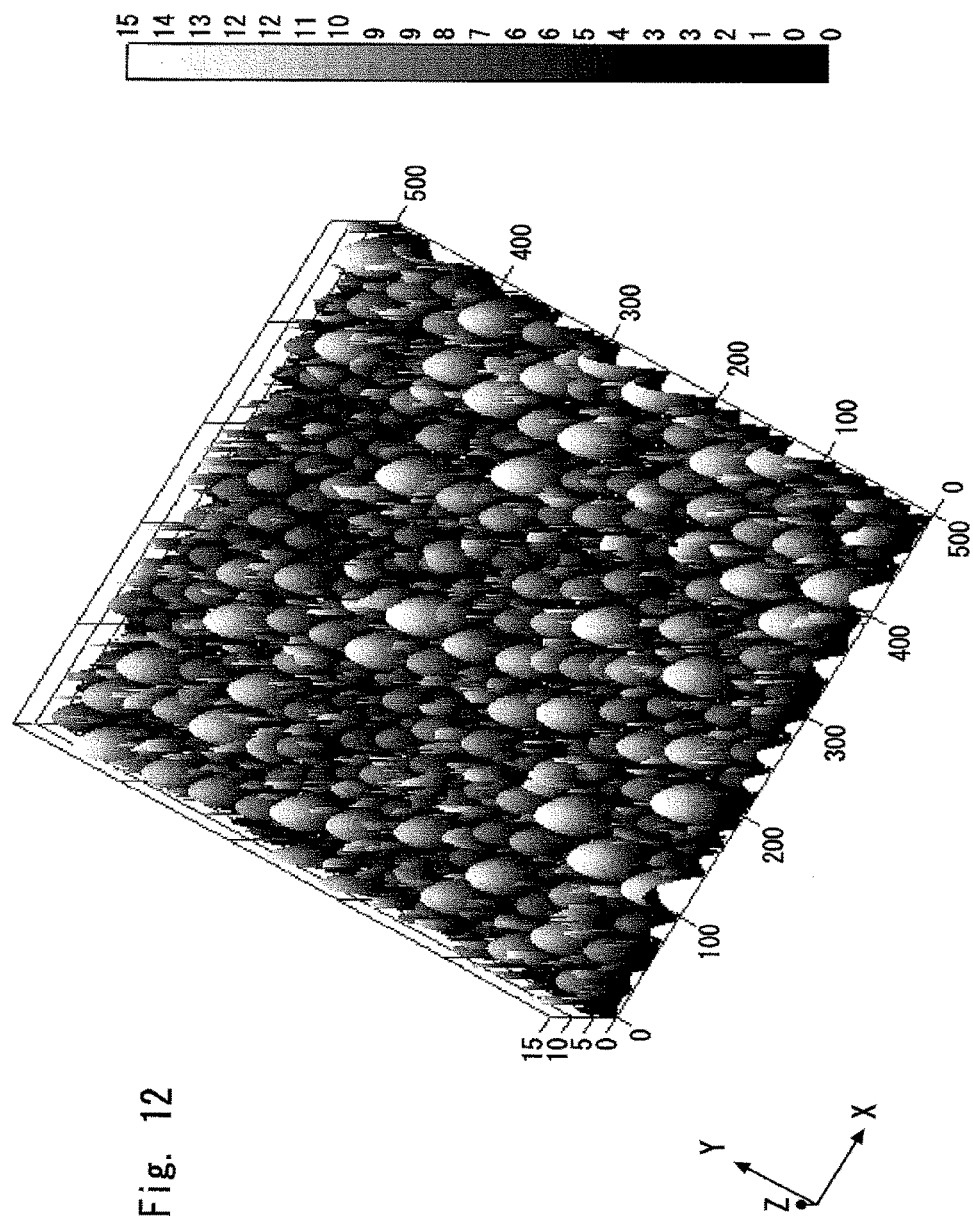
FIG. 12 is a view showing an example of a configured light diffusion pattern.

When the lenses 100 to 105 are placed until the ratio of vacant space becomes equal to or less than a predetermined threshold (which is 1% in this example), the result is as shown in FIG. 12.

In FIG. 12, the height from the bottom surface is represented by a gray scale, and it is darker as the height from the bottom surface is larger.

The light diffusion pattern design step (ST100) thereby ends.

A light diffusion plate having this light diffusion pattern is to be manufactured next Referring back to the flowchart of FIG. 1, a mold making step (ST200) is performed after the light diffusion pattern design step (ST100).

When the light diffusion pattern is designed, a process of making a mold for transferring this pattern is known, and it is briefly described below.

Figure 13:
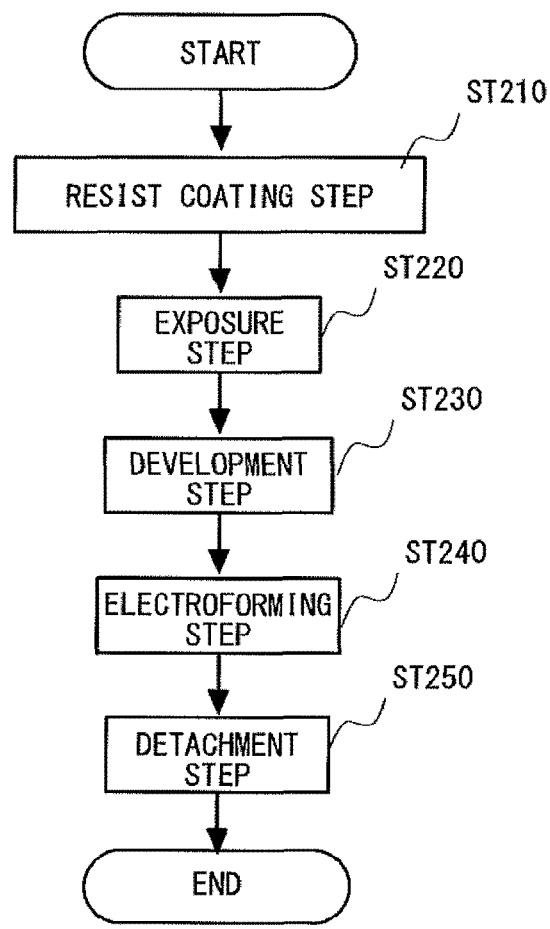
FIG. 13 is a flowchart showing a detailed procedure of a mold making step.

FIG. 13 is a flowchart showing a detailed procedure of the mold making step (ST200).

First, in ST210, photoresist is coated onto a substrate. The photoresist is a positive type, for example.

Photoresist may be coated onto a substrate by spin coating or the like. The thickness of a coating film may be any value as long as it is equal to or more than the lens height of the light diffusion pattern. It is preferred to bake the coated film at 70 to 110 degrees Celsius prior to the following exposure step (ST230).

Next, in ST220, the photoresist is exposed by application of a laser beam (ST220).

Specifically, a laser beam is scanned and applied to the photoresist film in accordance with a design result of the light diffusion pattern. The laser is applied in pulse form at each point for a time according to the height (depth) of the concaves and convexes of the light diffusion pattern.

The wavelength of a laser beam is not particularly limited, and it is selected appropriately according to the type of photoresist.

The wavelength of a laser beam to be selected may be 351 nm, 364 nm, 458 nm, 488 nm (the oscillation wavelength of Ar+laser), 351 nm, 406 nm, 413 nm (the oscillation wavelength of Kr+laser), 352 nm, 442 nm (the oscillation wavelength of He—Cd laser), 355 nm, 473 nm (the pulse oscillation wavelength of a diode-pumped solid state laser), 375 nm, 405 nm, 445 nm, 488 nm (semiconductor laser) and the like, for example.

The laser beam spot size φ at a focal position is generally represented by φ=k×λ/NA (k: constant of proportionality, λ: wavelength, NA: lens numerical aperture).

Then, in ST230, the photoresist after exposure is developed.

The photoresist is developed by applying a developer, for example. Although an alkaline developer such as tetramethyl ammonium hydroxide (TMAH) may be used as the developer, it should be determined according to the type of photoresist, and it is not limited to an alkaline developer. The photoresist is removed according to the light exposure, and an concave and convex pattern is formed in the photoresist.

After that, in ST240, a nickel mold is made by electroforming. Specifically, nickel is grown into plate form by electroforming (electrolytic plating) on the photoresist surface having the concave and convex pattern.

Finally, in ST250, the nickel plate is detached from the photoresist. A nickel mold (stamper) to which the concave and convex pattern on the photoresist has been inversely transferred is thereby obtained.

By the mold obtained in this manner, the light diffusion pattern is transferred to a resin substrate (ST300). A molding method is not limited, and examples are roll-to-roll molding, thermal press molding, molding using ultraviolet curable resin, injection molding and the like.

As the resin substrate, a resin sheet having ionization radiation transmissivity and flexibility is preferred for use, although it depends on the application of the light diffusion plate as a final product.

Although the thickness is not particularly limited, it may be a thin sheet of about 50 to 500 μm As a material of transparent resin substrate, polyester such as polyethylene terephthalate and polyethylene naphthalate, polymer of methacrylic acid or acrylic acid esters (so-called acrylic resin) such as polymethylmethacrylate, polymethylacrylate, polyethylacrylate and polyethylacrylate, polycarbonate, cellulose triacetate, polystyrene, polypropylene, or a composition with a mixture of prepolymer, oligomer or monomer having polymerizable unsaturated bond or epoxy group in a molecule may be used.

Examples of prepolymer and oligomer are unsaturated polyesters such as unsaturated dicarboxylic acid and polyhydric alcohol condensate, epoxy resin, methacrylates such as polyester methacrylate and polyether methacrylate, polyester acrylate, epoxy acrylate, urethane acrylate, polyether acrylate, polyol acrylate or melamine acrylate and the like.

EXAMPLE 1

Figure 14:
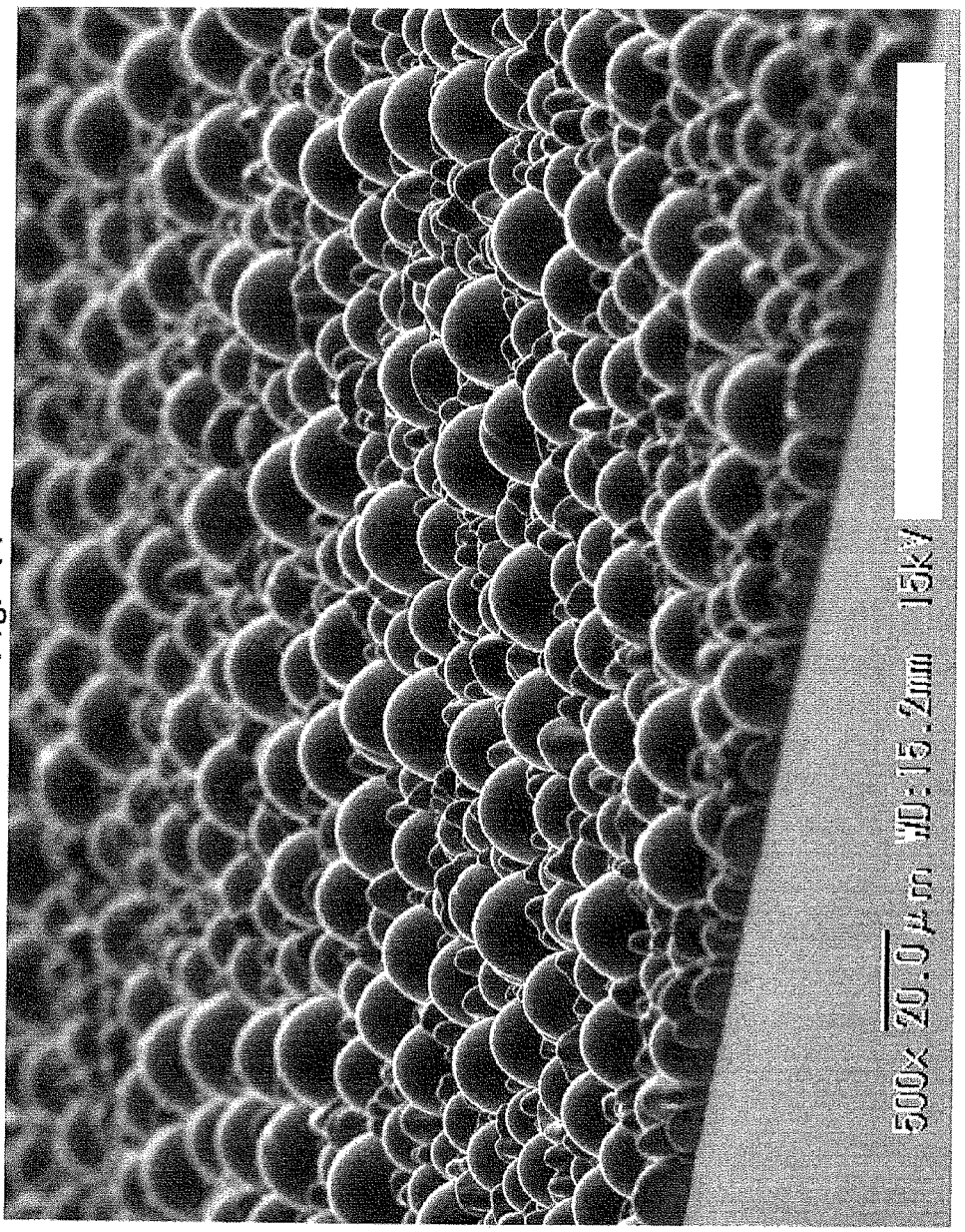
FIG. 14 is a view showing an SEM image of a light diffusion plate (KLD60).

As an example, a light diffusion pattern was designed to have a light diffusion angle of 60 degrees, and a light diffusion plate (KLD60) 300 was manufactured based on the pattern. FIG. 14 shows an SEM image (Scanning Electron Microscope) of the light diffusion plate (KLD60) 300.

The data of this pattern was generated based on the flowchart of FIG. 2. Based on the reference lens 100, similar figure lenses were created at a uniform probability, with a similarity magnification of 0.78 to 2.3. In the primary placement step, similar figure lenses corresponding to 80% of the area of the pattern region were randomly placed, the constraint that the lenses do not overlap was imposed, and the lens placement was adjusted by the Monte Carlo method. After that, according to the flowchart of FIG. 2, each step was repeated until the ratio of vacant space reached 0. It would be understood that the concaves and convexes of the light diffusion pattern were created by the reference lens 100, the similar figure lenses, and parts of them.

Figure 15:
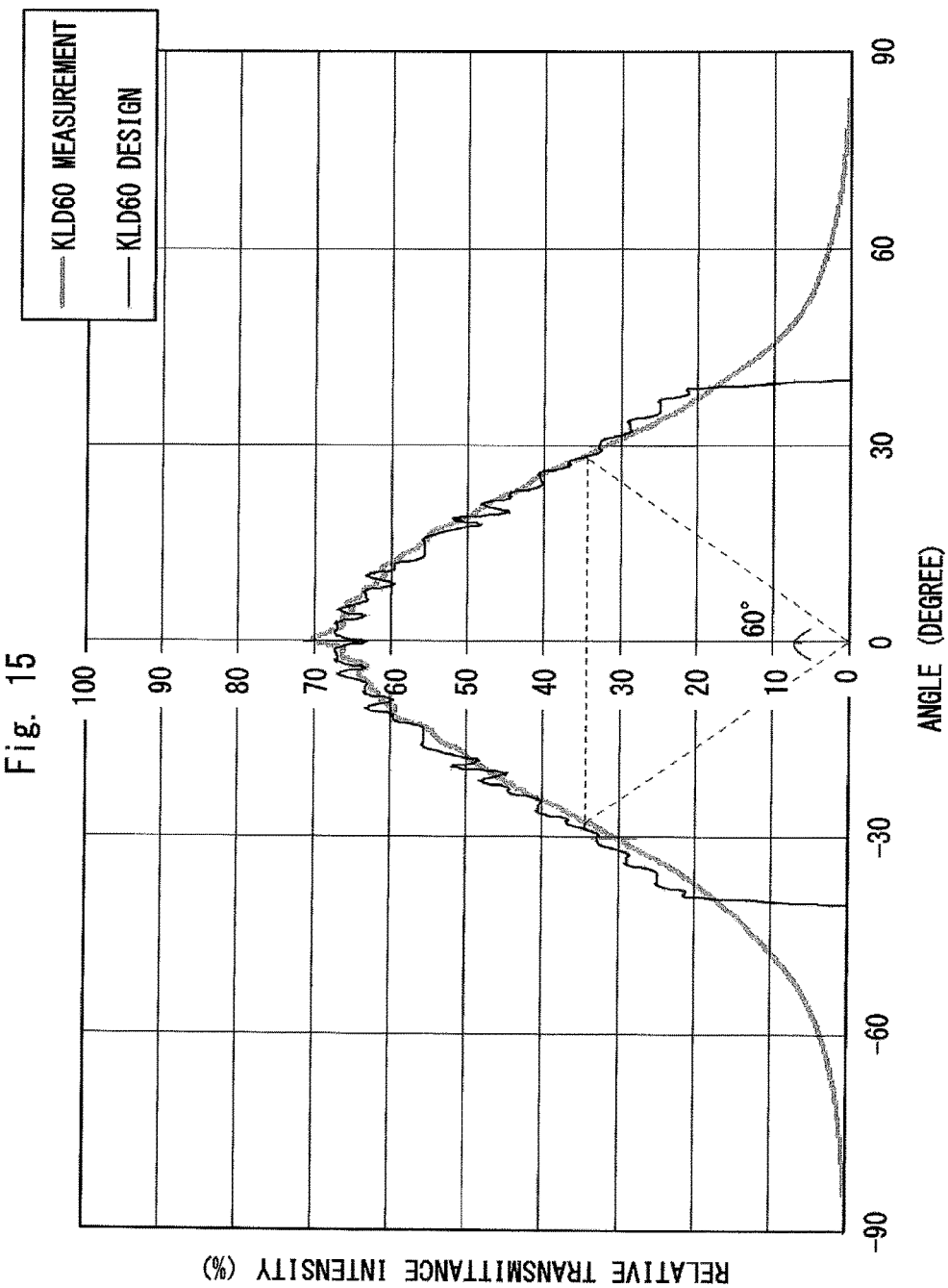
FIG. 15 is a graph showing design values and measured values of a transmittance distribution of KLD60.

The light diffusion angle of transmitted light to the light diffusion plate (KLD60) 300 was evaluated using a goniometer. FIG. 15 is a graph showing design values and measured values of the transmittance distribution of the light diffusion plate (KLD60) 300.

The light diffusion angle was 60 degrees, which is the same as the design value. Note that the light diffusion angle is the range of angle at which the relative transmittance intensity is larger than the half value of the relative transmittance intensity of normal incident light.

Further, in the light diffusion plate (KLD60) 300, lighting irregularities and coloring were not recognized from the transmitted light side, and the interference pattern was almost invisible.

MODIFIED EXAMPLE 1

In the above-described first embodiment, the case where, to eliminate the overlap of lenses, the lens 410 is left and the lens 420 is cut along a surface perpendicular to the bottom surface is described as an example.

Figure 16:
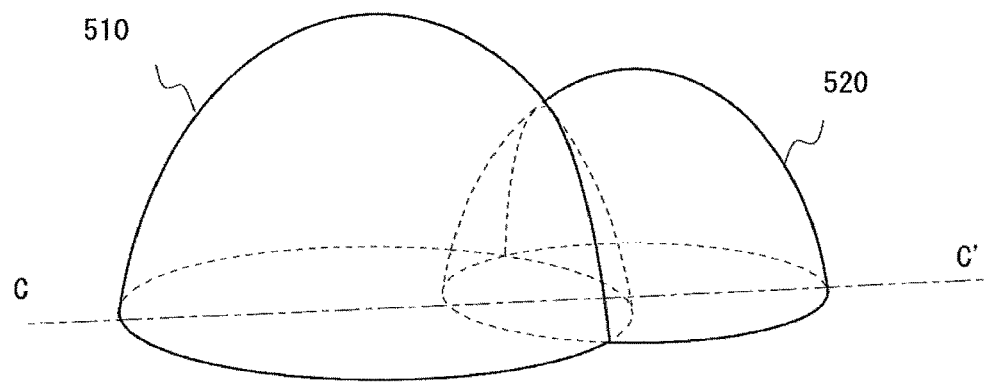
FIG. 16 is a view illustrating a modified example 1.

The present invention is not limited thereto, and there are other ways of eliminating the overlap of lenses. For example, it is assumed that two lenses overlap as shown in FIG. 16.

It is assumed that one lens is a lens 510, and another lens is a lens 520. The overlap is eliminated by cutting those lenses into two at the intersection of the visible outlines of the respective lenses.

The intersection of the visible outlines of the lenses 510 and 520 is an intersection line. The lenses 510 and 520 are cut into two along a surface 230 that includes the intersection line (FIG. 17).

Figure 17:
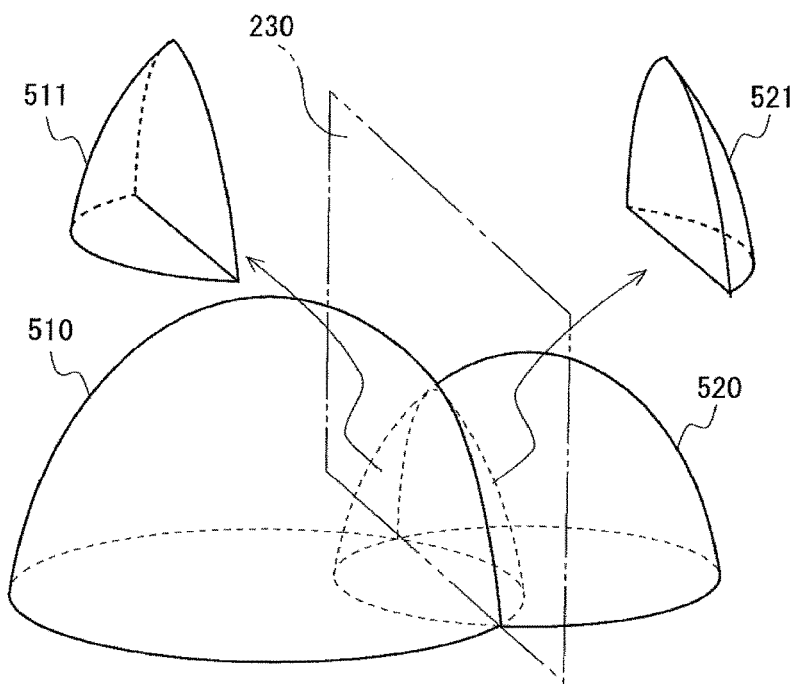
FIG. 17 is a view illustrating the modified example 1.

In FIG. 17, the intersection line is indicated by a heavy line. Further, a surface for cutting 230 is indicated by a chain double-dashed line. The overlap of lenses is thereby eliminated. Further, a part 511 is cut out of the lens 510, and a part 521 is cut out of the lens 520.

The cutout parts 511 and 521 are preferably positioned to other places.

MODIFIED EXAMPLE 2

Although the expression like "cutting a lens" is used in the above description for intuitive understanding, it may be considered as follows, since the purpose is to eliminate overlapping data eventually. Specifically, the fact that the lens data overlap means that two or more z-coordinates exist for the same (x,y) coordinates.

For example, data on one curved surface is selected, and data on another curved surface is ignored. When the final visible outline of the light diffusion pattern is obtained in this manner, one lens 410 is left and the other lens 420 is cut as described in the first embodiment.

Alternatively, data with a larger height coordinate (z-coordinate) is selected, and one with a smaller z-coordinate is ignored. When the final visible outline of the light diffusion pattern is obtained in this manner, it corresponds to the modified example 1.

Note that, however, the shape data of the part that has been ignored as above is preferably replicated and repositioned.

MODIFIED EXAMPLE 3

Although the parts (421, 511 and 521) that have been cut out to eliminate the overlap of lenses are repositioned in the above description, it is not always necessary to replicate the exactly same cutout parts.

Since the purpose is to attain desired light diffusion properties, they may be similar to a degree that can achieve the purpose. For example, when the surface for cutting is the curved surface 220 as illustrated in FIG. 10, a surface 421A that appears by the cutting is also curved (see FIG. 18). However, the surface 421A that has newly appeared does not largely affect the determination of light diffusion properties because it is not an original lens surface.

Figure 18:
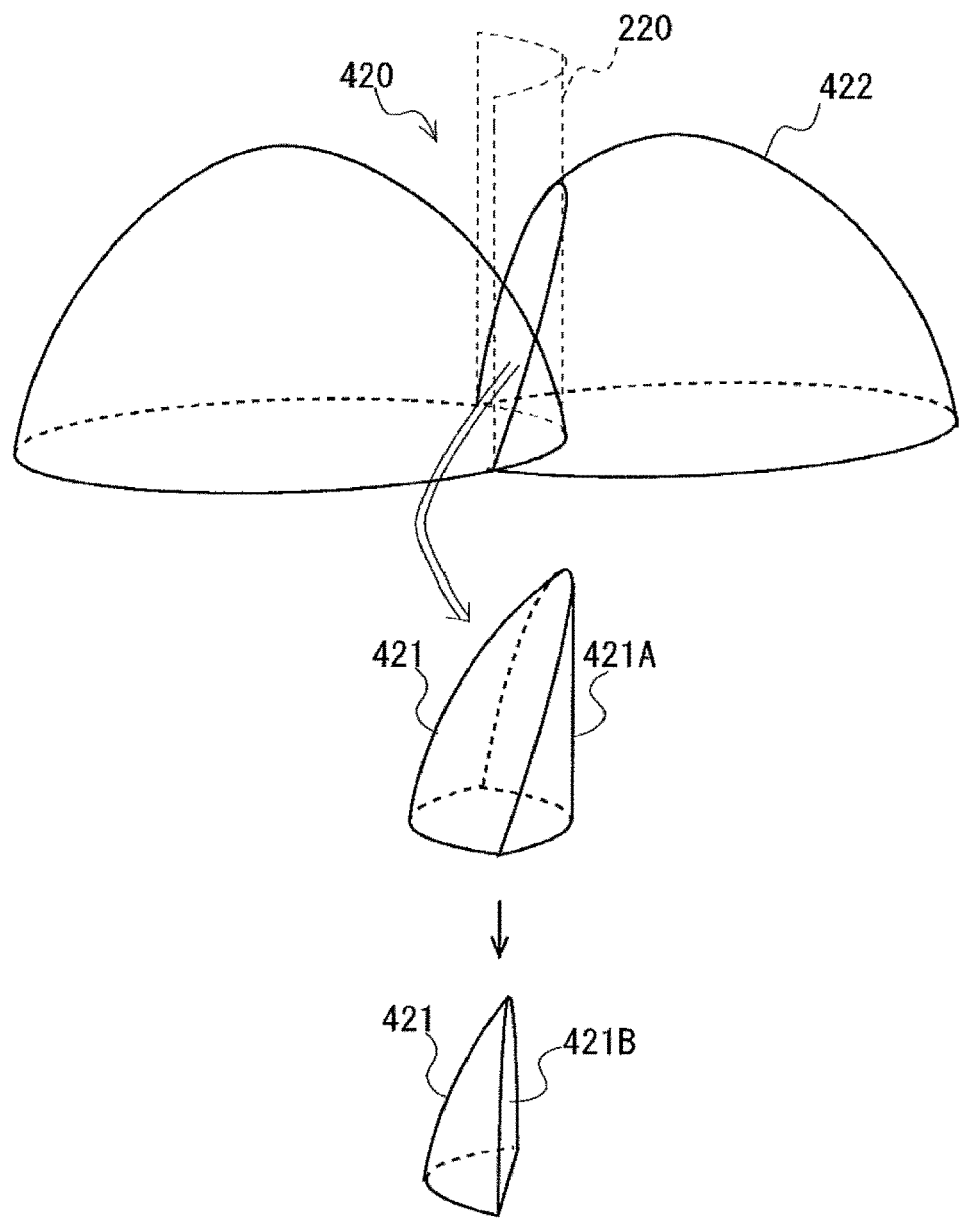
FIG. 18 is a view illustrating a modified example 3.

Accordingly, a surface that has newly appeared may be created as a flat surface 421B (see FIG. 18).

MODIFIED EXAMPLE 4

In the case where the area of the light diffusion plate is large, it requires a large amount of design data to place lenses one by one in the surface of the light diffusion plate, which can cause a problem in operating time and operating cost.

To reduce the amount of design data, the light diffusion pattern may be designed for each of unit regions, and then those unit regions may be combined into a large area.

The shape of a unit region may be any shape as long as tiling in the plane is possible, and it may be selected from triangle, tetragon, hexagon and various other polygons, for example.

The unit region is not limited to one type, and two or more types of unit regions may be combined for tiling in the plane. In the case of preparing two or more types of unit regions, their shapes and areas may be different from each other.

Figure 19:
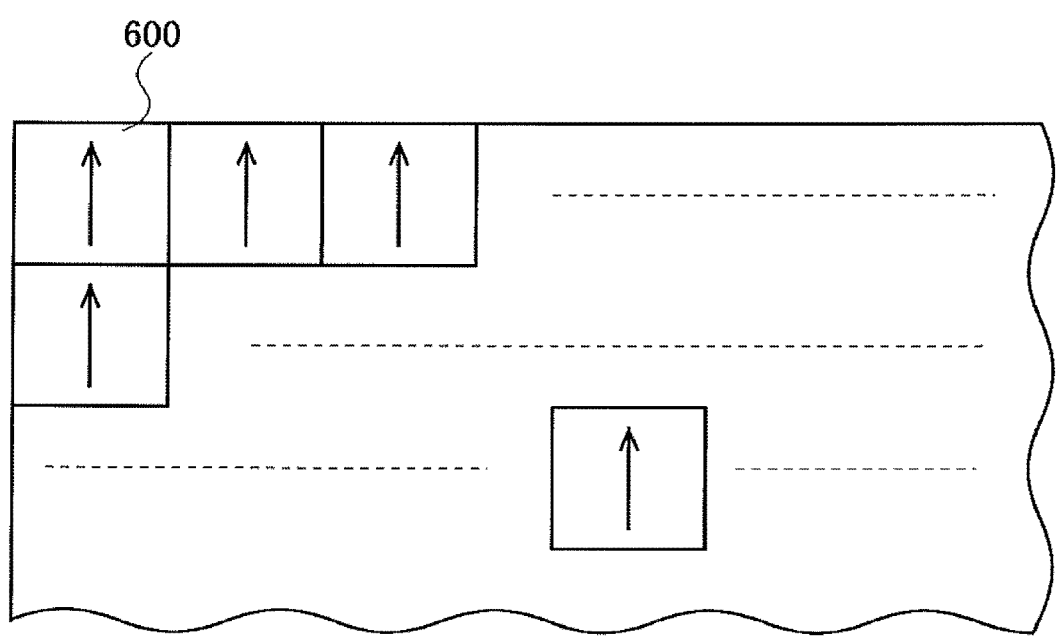
FIG. 19 is a view illustrating a modified example 4.

When tiling unit regions 600, all of them may be combined in the same orientation as the simplest way (see FIG. 19).

(The arrow in the figure indicates the orientation only for easier understanding.)

Figure 20:
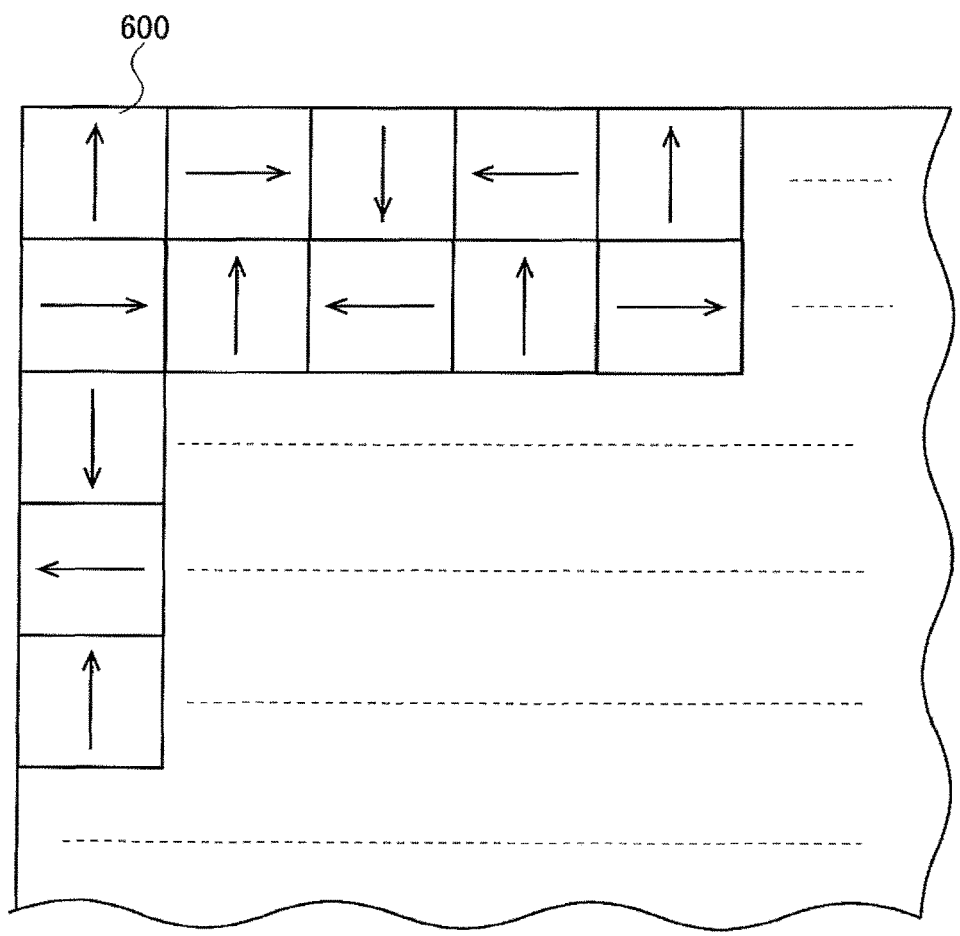
FIG. 20 is a view illustrating the modified example 4.

Alternatively, the orientation may vary in a regular manner (see FIG. 20).

Figure 21:
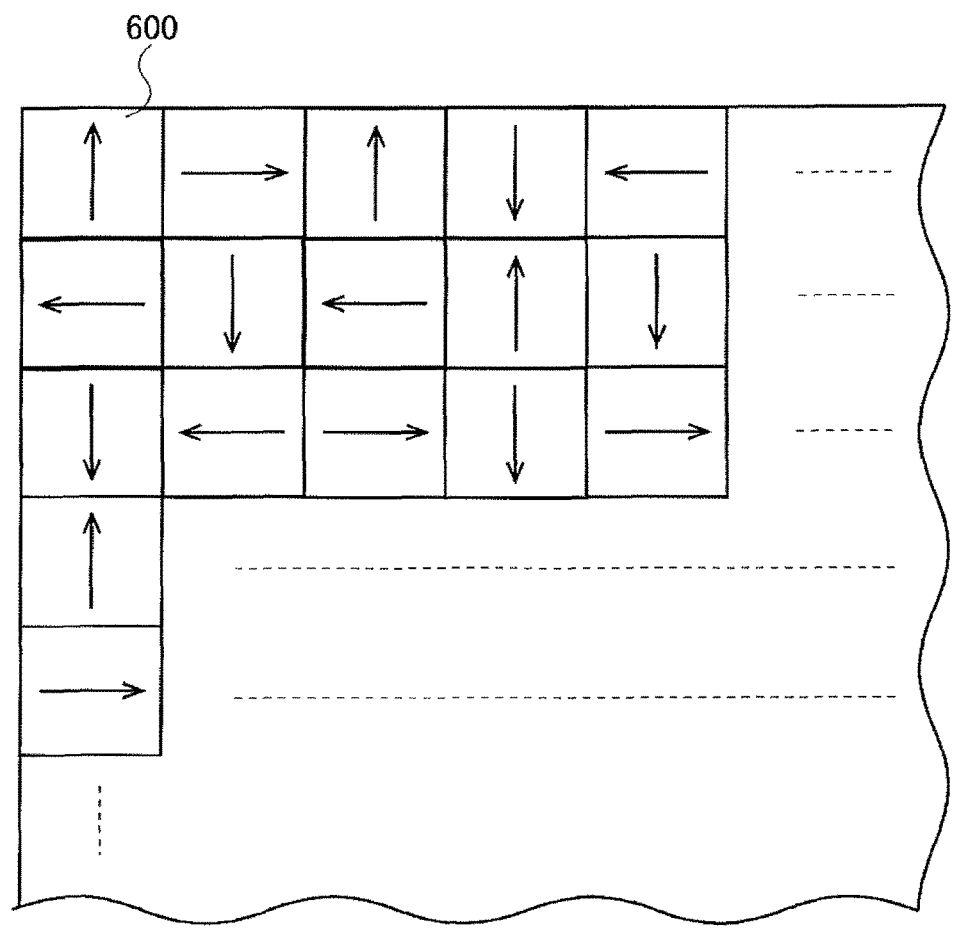
FIG. 21 is a view illustrating the modified example 4.

Alternatively, the orientation may vary in a random manner (see FIG. 21).

Note that unit regions are preferably polygons with many sides such as hexagon, rather than tetragon, considering that they are arranged in different orientations, either regularly or randomly.

This is because an interference pattern is less likely to occur when they are combined in various orientations.

Further, in order to reduce lighting irregularities and coloring, lenses are preferably continuous at the boundary when combining unit regions.

(If lenses (patterns) are not continuous at the boundary, the same boundary pattern appears constantly, which can cause the occurrence of lighting irregularities and coloring by interference.)

Figure 22:
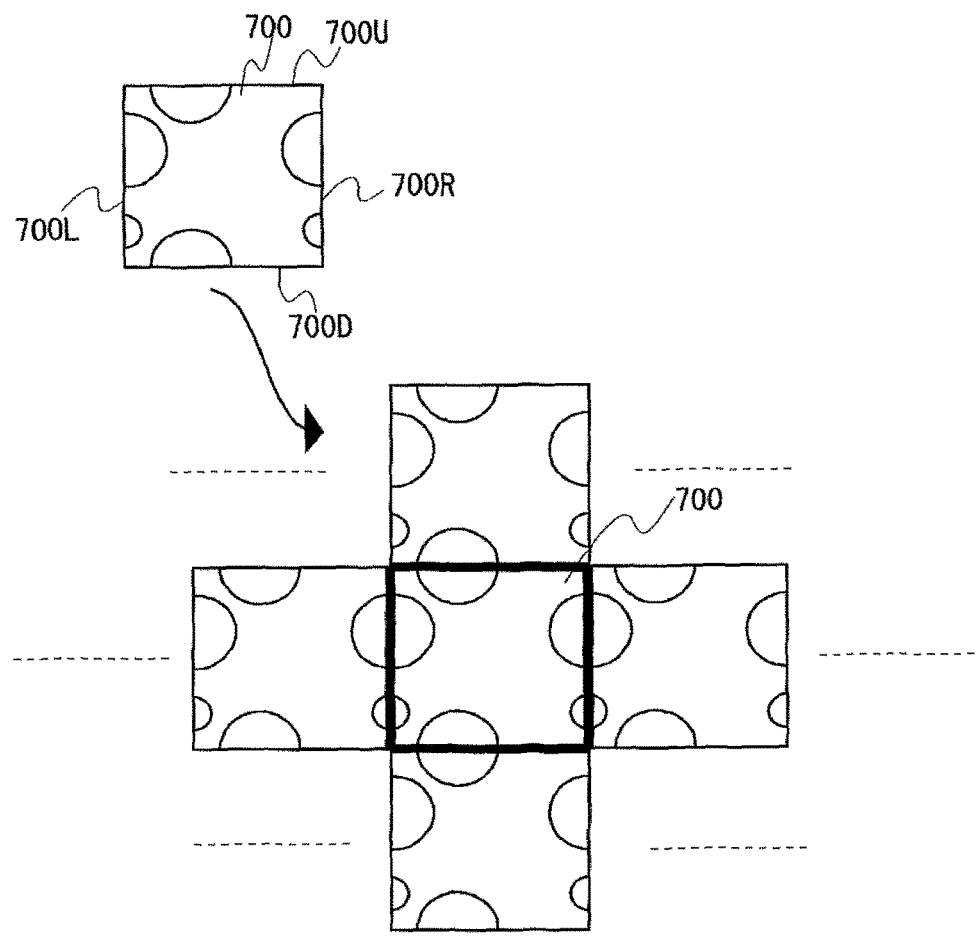
FIG. 22 is a view illustrating the modified example 4.

FIG. 22 shows the state where lenses are continuous at the boundary. When, in one unit region 700, lenses are designed to be joined between a left side 700L and a right side 700R and between an upper side 700U and a lower side 700D, the lenses (patterns) are joined at the boundary when tiling them. In the design of such unit regions, four sides are designed first, and then the inside is filled after that. (The point is that a part that is cut out on the left side 700L is placed at the symmetrical position on the right side 700R.)

Figure 23:
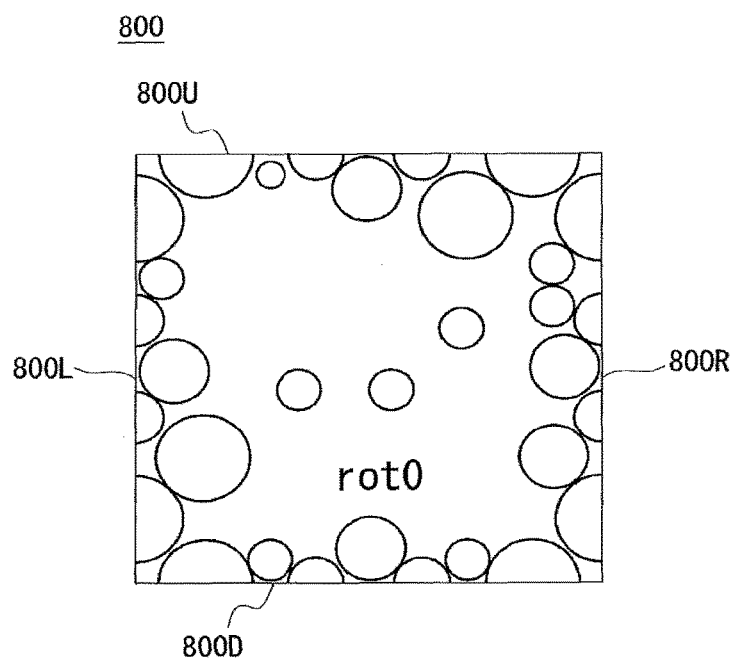
FIG. 23 is a view illustrating the modified example 4.

Further, examples where unit regions are combined in different orientations are described with reference to FIGS. 23 to 27. By designing the four sides of a unit region as shown in FIG. 23, lenses can be continuous at the boundary even when unit regions are rotated and combined in different orientations. As shown in FIG. 23, in one unit region 800, lenses can be continuous in any combination of a left side 800L, a right side 800R, an upper side 800U and a lower side 800D. Specifically, in any combination of one unit region 800 with those rotated at 90 degrees, 180 degrees and 270 degrees from FIG. 23, the lenses (patterns) are joined at the boundary when tiled.

Figure 24:
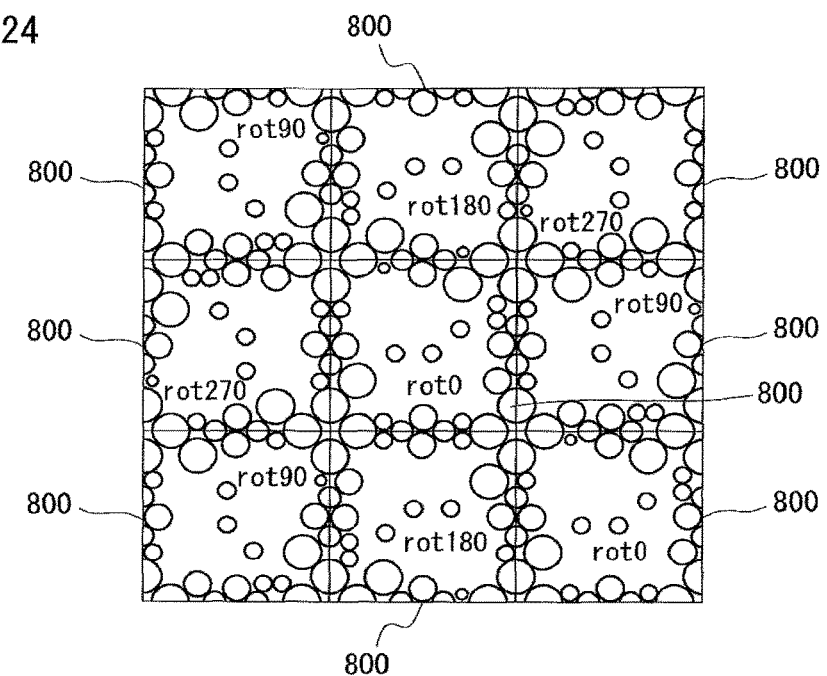
FIG. 24 is a view illustrating the modified example 4.

FIG. 24 is a view showing a combination of the unit regions 800 in various orientations. In FIG. 24, when the position of the unit region 800 shown in FIG. 23 is at a rotation angle of 0 degree (rot0), the state where it is rotated clockwise at 90 degrees from rot0 is rot90, the state where it is rotated at 180 degrees is rot180, and the state where it is rotated at 270 degrees is rot270. In FIG. 24, the lenses are continuous at every boundary between the unit regions 800.

Figure 25:
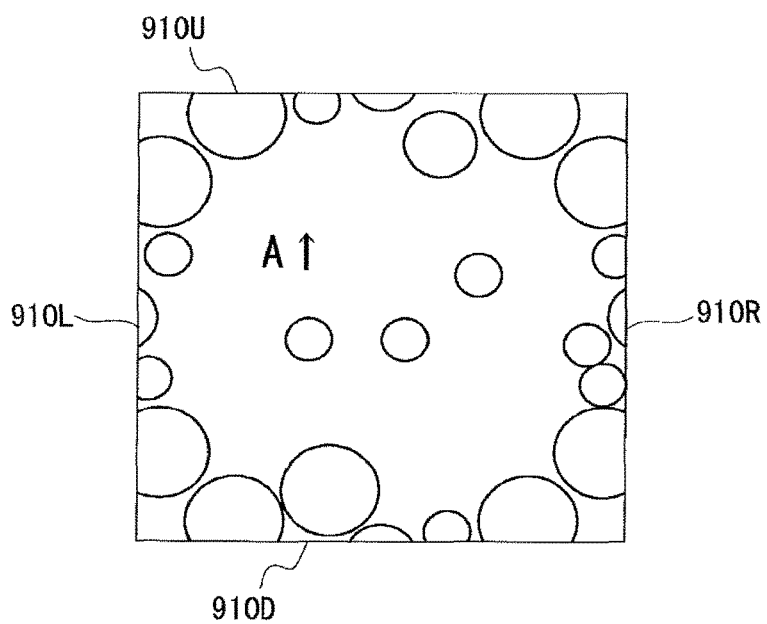
FIG. 25 is a view illustrating the modified example 4.
Figure 26:
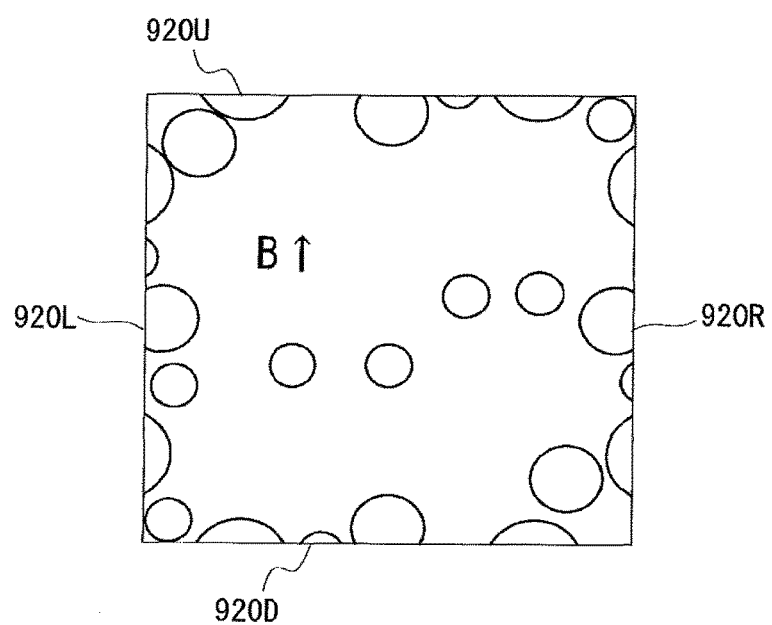
FIG. 26 is a view illustrating the modified example 4.

In addition, when two unit regions, a unit region A910 shown in FIG. 25 and a unit region B920 shown in FIG. 26, are prepared, for example, lenses can be continuous at boundaries of the two different unit areas. (The arrow in the figure indicates the orientation only for easier understanding.)

Figure 27:
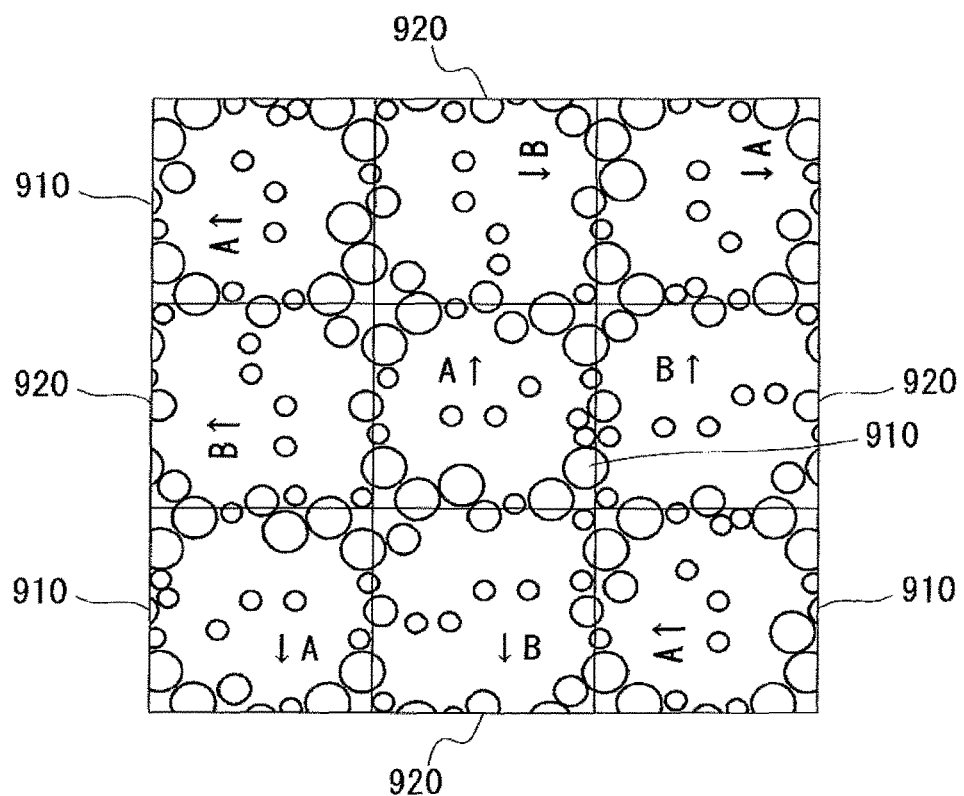
FIG. 27 is a view illustrating the modified example 4.

FIG. 27 is a view showing an example of tiling of the unit regions A910 and the unit regions B920 by combining them in various orientations. Lenses can be continuous at the boundary when a left side 910L, a right side 910R, an upper side 910U and a lower side 910D of the unit region A910 are combined with any of a left side 920L, a right side 920R, an upper side 920U and a lower side 920D of the unit region B920.

It should be noted that the present invention is not limited to the above-described exemplary embodiment and may be varied in many ways within the scope of the present invention.

For example, the shape of the bottom surface of the reference lens may be appropriately selected from circle, polygon, ellipse and the like. Further, the shape of the cross section of the reference lens may be rotationally symmetrical or different depending on orientation according to desired light diffusion properties. For example, when a lenticular shape or a prism shape is selected, an anisotropic light diffusion plate that exhibits desired light diffusion properties only in one direction can be provided.

Although a convex lens is used in the above embodiment, a concave lens may be used instead.

The light diffusion plate may be formed by machining or laser ablation, besides resin formation using a stamper.

In the above embodiment, after placing a plurality of lenses, allowing an overlap, in the random placement step (ST122), the overlap is eliminated in the overlap processing step (ST130).

As a matter of course, during the random placement step (ST122), the overlap processing step (ST130) may be performed each time an overlap occurs.

This application is based upon and claims the benefit of priority from Japanese patent application No. 2014-08186, filed on Apr. 11, 2014 and Japanese patent application No. 2014-235234, filed on Nov. 20, 2014, the disclosure of which is incorporated herein in its entirety by reference.

REFERENCE SIGNS LIST

100 . . . reference lens, 101-105 . . . similar figure lens, 200 . . . plane, 200D . . . lower side, 200L . . . left side, 210 . . . overlapping lens, 220 . . . line for cutting, 230 . . . line for cutting, 300 . . . light diffusion plate, 410 . . . lens, 420 . . . lens, 421 . . . part of lens, 510 . . . lens, 511 . . . part of lens, 520 . . . part of lens, 521 . . . part of lens, 600 . . . unit region, 700 . . . unit region

The invention claimed is:

1. A method for manufacturing a light diffusion plate, the method comprising:
    (A) designing a light diffusion pattern with a computer by:
        preparing lens data for a plurality of lenses having desired light diffusion properties;
        placing the plurality of lenses in a predetermined region of a plane;
        cutting out a part of at least one lens shape to form at least one cutout part, in order to eliminate at least one overlap of lenses occurring in the predetermined region during the placing of the plurality of lenses; and
        replicating a shape of the at least one cutout part and repositioning the at least one cutout part to another place in the predetermined region, to obtain an light diffusion pattern; and
    (B) forming a light diffusion plate based on lens data of the light diffusion pattern.

2. The method according to claim 1, wherein the preparing of the lens data comprises:
    designing a reference lens; and
    creating at least one additional lens having a similar shape to the reference lens.

3. The method according to claim 1, wherein the steps of placing, cutting, replicating, and repositioning are performed repeatedly until a ratio of vacant space of the light diffusion pattern becomes equal to or less than a predetermined value.

4. The method according to claim 1, wherein, in the step of cutting one lens and another lens that overlap, the another lens is cut along a surface perpendicular to a bottom surface of the another lens so as to leave the one lens no longer overlapping the another lens.

5. The method according to claim 1, wherein, in the step of cutting one lens and another lens that overlap, the one lens and the another lens are cut along a surface including an intersection line between visible outlines of the lenses.

6. The method according to claim 1, wherein the light diffusion pattern comprises a plurality of unit regions that are combined into the predetermined area.

7. The method according to claim 6, wherein light diffusion patterns of each of the unit regions are designed so that lens shapes are continuous at a boundary when the unit regions are combined.

8. The method of claim 1, wherein the forming of the light diffusion plate comprises: forming a mold of the light diffusion pattern based on the lens data of the light diffusion pattern; and molding a resin in the mold to obtain the light diffusion plate.

9. A light diffusion plate having a light diffusion pattern where a plurality of microscopic lenses are placed on one side, wherein the light diffusion plate is obtained by the method of claim 1.

* * * * *